US009742565B2

(12) United States Patent
Li (10) Patent No.: US 9,742,565 B2
(45) Date of Patent: Aug. 22, 2017

(54) METHOD AND SYSTEM FOR BACKING UP PRIVATE KEY OF ELECTRONIC SIGNATURE TOKEN (71) Applicant: Tendyron Corporation, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 0 days.

(21) Appl. No.: 14/893,379

(22) PCT Filed: Apr. 18, 2014

(86) PCT No.: PCT/CN2014/075731
§ 371 (c)(1),
(2) Date: Nov. 23, 2015

(87) PCT Pub. No.: WO2014/187206
PCT Pub. Date: Nov. 27, 2014

(65) Prior Publication Data
US 2016/0112193 A1 Apr. 21, 2016

(30) Foreign Application Priority Data
May 23, 2013 (CN) .......................... 2013 1 0195252

(51) Int. Cl.
H04L 29/06 (2006.01)
H04L 9/08 (2006.01)
H04L 9/32 (2006.01)

(52) U.S. Cl.
CPC .......... H04L 9/0894 (2013.01); H04L 9/0825 (2013.01); H04L 9/3247 (2013.01); H04L 9/3271 (2013.01)

(58) Field of Classification Search
CPC ... H04L 9/0894; H04L 9/0825; H04L 9/3247; H04L 9/3271
(Continued)

(56) References Cited

U.S. PATENT DOCUMENTS 5,265,164 A * 11/1993 Matyas ............... G06F 9/30003
380/2
7,028,181 B1 * 4/2006 McCullough ........... G06F 21/33
380/277
(Continued)

FOREIGN PATENT DOCUMENTS

CN 101488858 A 7/2009
CN 101567780 A 10/2009
(Continued)

OTHER PUBLICATIONS

PCT/CN2014/075731 English translation of the Written Opinion mailed Jul. 29, 2014, 9 pages.
(Continued)

Primary Examiner — Sarah Su
(74) Attorney, Agent, or Firm — Lathrop & Gage LLP (57) ABSTRACT Provided are a method and system for backing up a private key in an electronic signature token, the method comprising: a first electronic signature token and a second electronic signature token negotiate an encryption strategy and a corresponding decryption strategy to use for communication therebetween; the first electronic signature token utilizes the encryption strategy to encrypt a request data packet and transmits the encrypted request data packet; the second electronic signature token decrypts the encrypted request data packet; the second electronic signature token utilizes the encryption strategy to encrypt a response data packet and transmits the encrypted responses data packet; and the first electronic signature token utilizes the decryption strategy to decrypt the response data packet, and acquires a private key from the response data packet.

12 Claims, 2 Drawing Sheets (58) Field of Classification Search
USPC .................................................. 380/277, 286
See application file for complete search history.

(56) References Cited

U.S. PATENT DOCUMENTS

| | | | |
|---|---|---|---|
| 7,275,155 B1* | 9/2007 | Aull ......................... | H04L 9/00 |
| | | | 713/157 |
| 2006/0136735 A1* | 6/2006 | Plotkin .................. | G06F 21/85 |
| | | | 713/182 |
| 2008/0104417 A1 | 5/2008 | Nachtigall et al. | |
| 2011/0252236 A1* | 10/2011 | De Atley ............ | G06F 11/1464 |
| | | | 713/168 |
| 2016/0057125 A1* | 2/2016 | Li ........................... | G06F 21/31 |
| | | | 713/168 |
| 2016/0105286 A1* | 4/2016 | Li ........................ | H04L 9/3234 |
| | | | 380/286 |

FOREIGN PATENT DOCUMENTS

| | | |
|---|---|---|
| CN | 102739401 A | 10/2012 |
| CN | 102831362 A | 12/2012 |
| CN | 102932140 A | 2/2013 |
| CN | 103117855 A | 5/2013 |
| CN | 103248491 S | 8/2013 |
| CN | 103269271 A | 8/2013 |

OTHER PUBLICATIONS

PCT/CN2014/075731 English translation of the International Search Report mailed Jul. 29, 2014, 2 pages.

\* cited by examiner

METHOD AND SYSTEM FOR BACKING UP PRIVATE KEY OF ELECTRONIC SIGNATURE TOKEN

CROSS-REFERENCE TO RELATED APPLICATIONS

This present application is a U.S. national phase application of International Application No. PCT/CN2014/075731, filed on Apr. 18, 2014, which is based upon and claims priority to Chinese Patent Application No. 201310195252.X, filed with the State Intellectual Property Office of P. R. China on May 23, 2013, the entire contents of which are incorporated herein by reference.

FIELD

The present disclosure relates to electronic technology, and more particularly to a method and a system for backing up a private key of an electronic signature token.

BACKGROUND

In the related art, an electronic signature token stores a user's private key and digital signature, and authenticates the user's identity using a built-in public key algorithm. Ideally, the user's private key in the electronic signature token cannot be read using any methods, thus ensuring the security of the authentication of the user. However, once the electronic signature token is lost, it is impossible to obtain the original private key, and the user has to apply for a new electronic signature token, key information like the private key and serial number has to be re-distributed and obtained, and the user needs to update the electronic signature token, thus increasing the maintenance cost of the electronic signature token. Therefore, how to maintain the electronic signature token efficiently becomes an urgent problem.

SUMMARY

In order to solve at least one of above problems, the present disclosure provides a method and a system for backing up a private key of an electronic signature token.

To achieve the above objectives, technical solutions of the present disclosure are realized as follows.

A method for backing up a private key of an electronic signature token, including: obtaining by each of a first electronic signature token and a second electronic signature token a first matching code; negotiating by the first electronic signature token and the second electronic signature token using the first matching code, an encrypting strategy and a decrypting strategy corresponding to the encrypting strategy used for communication between the first electronic signature token and the second electronic signature token; encrypting by the first electronic signature token a private key backup request data packet using the encrypting strategy, in which the private key backup request data packet includes matching code information; sending by the first electronic signature token an encrypted private key backup request data packet; decrypting by the second electronic signature token the encrypted private key backup request data packet to obtain the private key backup request data packet, after receiving the encrypted private key backup request data packet; obtaining by the second electronic signature token a second matching code from the matching code information in the private key backup request data packet, in which the second matching code is used as a first pending verification code; if the first pending verification code is identical with the first matching code obtained locally, encrypting by the second electronic signature token a private key backup response data packet using the encrypting strategy, in which the private key backup response data packet includes the private key; sending by the second electronic signature token an encrypted private key backup response data packet; and decrypting by the first electronic signature token the encrypted private key backup response data packet using the decrypting strategy to obtain the private key backup response data packet after obtaining the encrypted private key backup response data packet, and obtaining the private key from the private key backup response data packet.

In some embodiments, negotiating by the first electronic signature token and the second electronic signature token using the first matching code, an encrypting strategy and a decrypting strategy corresponding to the encrypting strategy used for communication between the first electronic signature token and the second electronic signature token, includes: sending by the first electronic signature token a second pending verification code to the second electronic signature token, in which the first matching code obtained by the first electronic signature token is used as the second pending verification code; determining by the second electronic signature token whether the second pending verification code is identical with the first matching code obtained locally, after obtaining the second pending verification code; if the second pending verification code is identical with the first matching code obtained locally, generating by the second electronic signature token the encrypting strategy and the decrypting strategy corresponding to the encrypting strategy used for communication between the first electronic signature token and the second electronic signature token; and sending by the second electronic signature token at least the decrypting strategy to the first electronic signature token.

In some embodiments, negotiating by the first electronic signature token and the second electronic signature token using the first matching code, an encrypting strategy and a decrypting strategy corresponding to the encrypting strategy used for communication between the first electronic signature token and the second electronic signature token, includes: obtaining by the first electronic signature token and the second electronic signature token a correspondence among first matching codes, encrypting strategies, and decrypting strategies; searching for, by the first electronic signature token and the second electronic signature token, the encrypting strategy and the decrypting strategy corresponding to the first matching code according to the correspondence; and if the encrypting strategy and the decrypting strategy are found, taking the encrypting strategy and the decrypting strategy found as the encrypting strategy and the decrypting strategy corresponding to the encrypting strategy used for communication between the first electronic signature token and the second electronic signature token.

In some embodiments, the private key backup request data packet further includes a first signature issued by a CA server to the first electronic signature token; and before obtaining by the second electronic signature token the second matching code from the matching code information in the private key backup request data packet, the method further includes: verifying the first signature by the second electronic signature token after receiving the private key backup request data packet; and if the first signature passes verification, obtaining by the second electronic signature token the second matching code from the matching code information in the private key request data packet.

In some embodiments, sending by the first electronic signature token the encrypted private key backup request data packet includes: signing by the first electronic signature token the encrypted private key backup request data packet, and sending the signed and encrypted private key backup request data packet; and before decrypting by the second electronic signature token the encrypted private key backup request data packet to obtain the private key backup request data packet, the method further includes: verifying by the second electronic signature token the signed and encrypted private key backup request data packet after obtaining the signed and encrypted private key backup request data packet; and if the signed and encrypted private key backup request data packet passes verification, decrypting by the second electronic signature token the encrypted private key backup request data packet to obtain the private key backup request data packet.

In some embodiments, the matching code information in the private key backup request data packet includes an encrypted matching code; and obtaining by the second electronic signature token the second matching code from the matching code information in the private key backup request data packet includes: obtaining by the second electronic signature token the decrypting strategy of the matching code information in the private key backup request data packet, and decrypting the matching code information in the private key backup request data packet using the decrypting strategy to obtain the second matching code.

In some embodiments, the private key backup response data packet further includes a second signature issued by the CA server to the second electronic signature token; and before decrypting by the first electronic signature token using the decrypting strategy the encrypted private key backup response data packet to obtain the private key backup response data packet, the method further includes: verifying the second signature by the first electronic signature token after obtaining the encrypted private key backup response data packet; if the second signature passes verification, decrypting by the first electronic signature token using the decrypting strategy the encrypted private key backup response data packet to obtain the private key backup response data packet.

In some embodiments, sending by the second electronic signature token the encrypted private key backup response data packet includes: signing by the second electronic signature token the encrypted private key backup response data packet, and sending the signed and encrypted private key backup response data packet; before decrypting by the first electronic signature token using the decrypting strategy the encrypted private key backup response data packet to obtain the private key backup response data packet, the method further includes: verifying by the first electronic signature token the signed and encrypted private key backup response data packet after obtaining the signed and encrypted private key backup response data packet; if the signed and encrypted private key backup response data packet passes verification, decrypting by the first electronic signature token using the decrypting strategy the encrypted private key backup response data packet to obtain the private key backup response data packet.

A system for backing up a private key of an electronic signature token, including a first electronic signature token and a second electronic signature token, in which the first electronic signature token comprises a first obtaining component, a first negotiation component, a first encrypting component, a first sending component, a first decrypting component and a fourth obtaining component, the second electronic signature token comprises a second obtaining component, a second negotiation component, a second decrypting component, a third obtaining component, a second encrypting component, and a second sending component. Each of the first obtaining component and the second obtaining component is configured to obtain a first matching code. The first negotiation component and the second negotiation component are configured to negotiate using the first matching code, an encrypting strategy and a decrypting strategy corresponding to the encrypting strategy used for communication between the first electronic signature token and the second electronic signature token. The first encrypting component is configured to encrypt a private key backup request data packet using the encrypting strategy, in which the private key backup request data packet includes matching code information. The first sending component is configured to send an encrypted private key backup request data packet. The second decrypting component is configured to decrypt the encrypted private key backup request data packet to obtain the private key backup request data packet, after receiving the encrypted private key backup request data packet. The third obtaining component is configured to obtain a second matching code from the matching code information in the private key backup request data packet, and to take the second matching code as a first pending verification code. The second encrypting component is configured to encrypt a private key backup response data packet using the encrypting strategy if the first pending verification code is identical with the first matching code obtained locally, in which the private key backup response data packet includes the private key. The second sending component is configured to send an encrypted private key backup response data packet. The first decrypting component is configured to decrypt the encrypted private key backup response data packet using the decrypting strategy to obtain the private key backup response data packet, after obtaining the encrypted private key backup response data packet. The fourth obtaining component is configured to obtain the private key from the private key backup response data packet.

In some embodiments, the first negotiation component is configured to send a second pending verification code to the second electronic signature token, in which the first matching code obtained by the first electronic signature token is used as the second pending verification code; and the second negotiation component is configured to determine whether the second pending verification code is identical with the first matching code obtained locally after obtaining the second pending verification code, to generate the encrypting strategy and the decrypting strategy corresponding to the encrypting strategy used for communication between the first electronic signature token and the second electronic signature token if the second pending verification code is identical with the first matching code obtained locally, and to send the decrypting strategy to the first negotiation component.

In some embodiments, each of the first negotiation component and the second negotiation component is configured to obtain a correspondence among first matching codes, encrypting strategies, and decrypting strategies, to search for the encrypting strategy and the decrypting strategy corresponding to the first matching code according to the correspondence, and to take the encrypting strategy and the decrypting strategy found as the encrypting strategy and the decrypting strategy corresponding to the encrypting strategy used for communication between the first electronic signature token and the second electronic signature token if the encrypting strategy and the decrypting strategy are found.

In some embodiments, the private key backup request data packet further includes a first signature issued by a CA server to the first electronic signature token; the second electronic signature token further includes a first verification component, and the first verification component is configured to verify the first signature after obtaining the private key backup request data packet, and to trigger a process of obtaining the second matching code from the matching code information in the private key backup request data packet, if the first signature passes verification.

In some embodiments, the first sending component is configured to sign the encrypted private key backup request data packet, and to send the signed and encrypted private key backup request data packet; the second electronic signature token further includes a second verification component, and the second verification component is configured to verify the signed and encrypted private key backup request data packet after obtaining the signed and encrypted private key backup request data packet, and to trigger a process of decrypting the encrypted private key backup request data packet to obtain the private key backup request data packet, if the signed and encrypted private key backup request data packet passes verification.

In some embodiments, the matching code information in the private key backup request data packet includes an encrypted matching code; and the third obtaining component is configured to obtain the decrypting strategy of the matching code information in the private key backup request data packet, and to decrypt the matching code information in the private key backup request data packet using the decrypting strategy to obtain the second matching code.

In some embodiments, the private key backup response data packet further includes a second signature issued by the CA server to the second electronic signature token; the first electronic signature token further includes a third verification component, and the third verification component is configured to verify the second signature after obtaining the encrypted private key backup response data packet, and to trigger a process of decrypting the encrypted private key backup response data packet using the decrypting strategy to obtain the private key backup response data packet, if the second signature passes verification.

In some embodiments, the second sending component is configured to sign the encrypted private key backup response data packet, and to send the signed and encrypted private key backup response data packet; the second electronic signature token further includes a fourth verification component, and the fourth verification component is configured to verify the signed and encrypted private key backup response data packet after obtaining the signed and encrypted private key backup response data packet and to trigger a process of decrypting the encrypted private key backup response data packet using the decrypting strategy to obtain the private key backup response data packet, if the signed and encrypted private key backup response data packet passes verification.

Compared to the related art, technical solutions in the present disclosure at least have following benefits. The first electronic signature token and the second electronic signature token determine the encrypting strategy and the decrypting strategy used for communication between the first electronic signature token and the second electronic signature token by using the first matching code, thus improving the randomness of the encrypting strategy and the decrypting strategy, enhancing the communication safety between the first electronic signature token and the second electronic signature token, and ensuring the safety of transmitting the private key in the safe communication environment between the first electronic signature token and the second electronic signature token. Moreover, the first electronic signature token sends the matching code obtained by itself to the second electronic signature token, and the second electronic signature token determines whether there is the primary-backup relationship between the second electronic signature token and the first electronic signature token according to the matching code, and transmits the private key after determining the primary-backup relationship between the second electronic signature token and the first electronic signature token, thus ensuring the safety of backing up the private key.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technique solution in embodiments of the present disclosure will be described in the following with reference to drawings in the embodiments of the present disclosure. Obviously, the embodiments to be described only are some embodiments of the present disclosure, instead of all the embodiments thereof. Based on embodiments of the present disclosure, other embodiments obtained by those having ordinary skills in the related art without making creative labors fall into a protection scope of the present disclosure.

In the description of the present disclosure, it is to be understood that relative terms such as "central", "longitudinal", "lateral", "up", "down", "front", "rear", "right", "left", "vertical", "horizontal", "bottom", "top", "inner", "outer" as well as derivative thereof should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation, and thus embodiments of the present disclosure are not limited to these. In addition, terms such as "first" and "second" are used herein for purposes of description and are not intended to indicate or imply relative importance or significance.

In the description of the present disclosure, unless specified or limited otherwise, it should be noted that, terms "mounted," "connected" and "coupled" may be understood broadly, such as permanent connection or detachable connection, electronic connection or mechanical connection, direct connection or indirect connection via intermediary, inner communication or interaction between two elements. These having ordinary skills in the art should understand the specific meanings in the present disclosure according to specific situations.

In the following, embodiments of the present disclosure will be described in detail with reference to the drawings.

Figure 1:
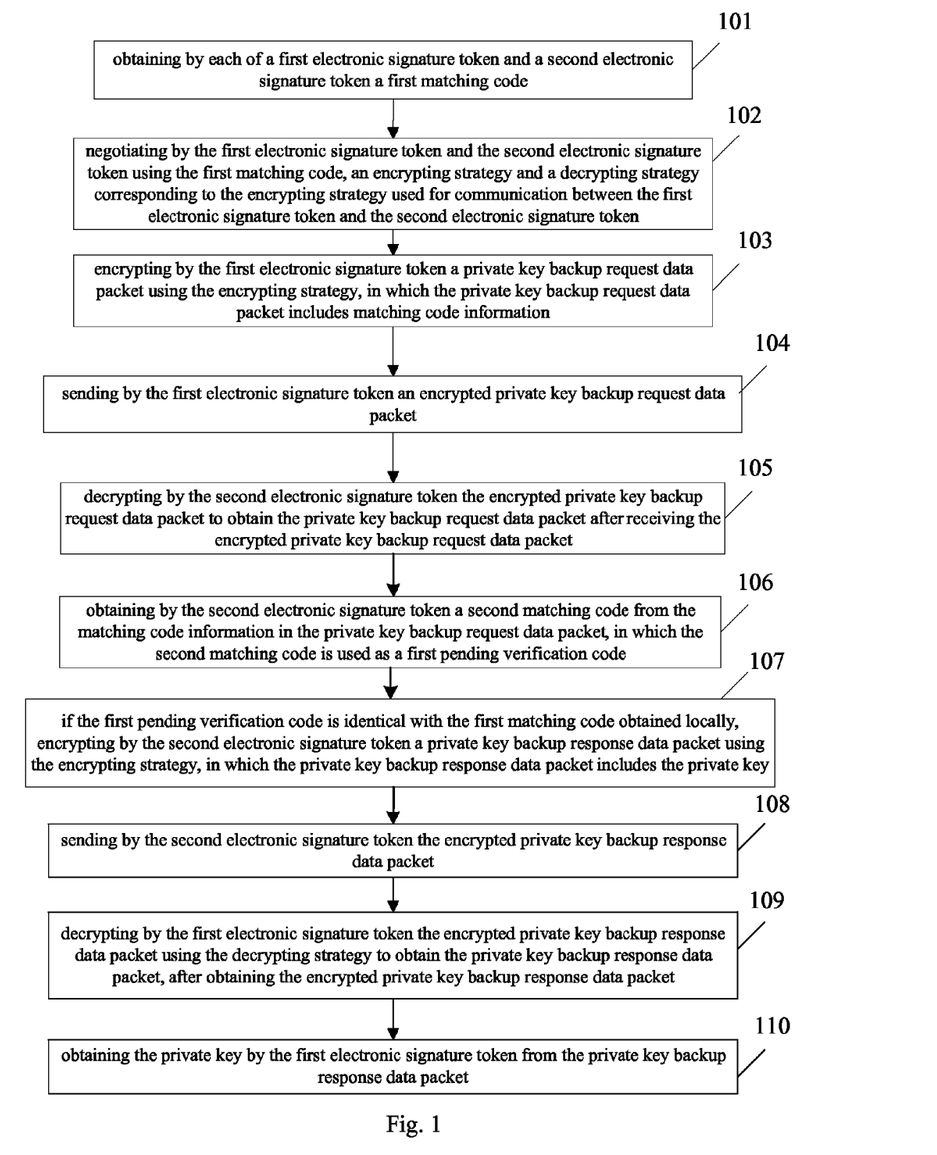
FIG. 1 is a flow chart of a method for backing up a private key of an electronic signature token according to an embodiment of the present disclosure.

FIG. 1 is a flow chart of a method for backing up a private key in electronic signature token according to an embodiment of the present disclosure. The method embodiment shown in FIG. 1 includes following steps.

In step 101, each of a first electronic signature token and a second electronic signature token obtains a first matching code.

Specifically, the first matching code may be at least one of words, numbers, and characters. Each of the first electronic signature token and the second electronic signature token may obtain the first matching code via manual input, a data transmission interface or network. Alternatively, the second electronic signature token may generate a first matching code according to a pre-stored generating strategy, and output the first matching code, for example, display or broadcast the first matching code, and then the first electronic signature token obtains the first matching code output by the second electronic signature token. Obviously, the first electronic signature token may obtain the first matching code via wired or wireless transmission, or via manual input of the user. Certainly, the first matching code may sent by a background server of a bank to the first electronic signature token and the second electronic signature token, such that the first electronic signature token and the second electronic signature token obtain the first matching code.

In the method of generating by the second electronic signature token the first matching code and then obtaining by the first electronic signature token the first matching code, there is no need for a background server of a bank to send the first matching code, and thus the interaction process is simple, compared to the method of sending the first matching code by the background server of the bank.

In step 102, the first electronic signature token and the second electronic signature token negotiate using the first matching code, an encrypting strategy and a decrypting strategy corresponding to the encrypting strategy used for communication between the first electronic signature token and the second electronic signature token.

In step 103, the first electronic signature token encrypts a private key backup request data packet using the encrypting strategy, in which the private key backup request data packet comprises matching code information.

In step 104, the first electronic signature token sends an encrypted private key backup request data packet.

In step 105, the second electronic signature token decrypts the encrypted private key backup request data packet to obtain the private key backup request data packet, after obtaining the encrypted private key backup request data packet.

In step 106, the second electronic signature token obtains a second matching code from the matching code information in the private key backup request data packet, in which the second matching code is used as a first pending verification code.

In step 107, if the first pending verification code is identical with the first matching code obtained locally, the second electronic signature token encrypts a private key backup response data packet using the encrypting strategy, in which the private key backup response data packet includes a private key.

In step 108, the second electronic signature token sends an encrypted private key backup response data packet.

In step 109, after obtaining the encrypted private key backup response data packet, the first electronic signature token decrypts the encrypted private key backup response data packet using the decrypting strategy to obtain the private key backup response data packet.

In step 110, the first electronic signature token obtains the private key from the private key backup response data packet.

Compared to the related art, technical solutions in the present disclosure at least have following benefits. The first electronic signature token and the second electronic signature token determine the encrypting strategy and the decrypting strategy used for communication between the first electronic signature token and the second electronic signature token by using the first matching code, thus improving the randomness of the encrypting strategy and the decrypting strategy, enhancing the communication safety between the first electronic signature token and the second electronic signature token, and ensuring the safety of transmitting the private key in the safe communication environment between the first electronic signature token and the second electronic signature token. Moreover, the first electronic signature token sends the matching code obtained by itself to the second electronic signature token, and the second electronic signature token determines whether there is the primary-backup relationship between the second electronic signature token and the first electronic signature token according to the matching code, and transmits the private key after determining the primary-backup relationship between the second electronic signature token and the first electronic signature token, thus ensuring the safety of backing up the private key.

The method embodiment provided in the present disclosure is further described as follows.

In some embodiments, the first electronic signature token and the second electronic signature token may negotiate the encrypting strategy and the decrypting strategy corresponding to the encrypting strategy used for communication between the first electronic signature token and the second electronic signature token in following two ways.

Way 1: the first electronic signature token sends a second pending verification code to the second electronic signature token, in which the first matching code obtained by the first electronic signature token is used as the second pending verification code. The second electronic signature token receives the second pending verification code, and determines whether the second pending verification code is identical with the first matching code obtained locally. If the second pending verification code is identical with the first matching code obtained locally, the second electronic signature token generates the encrypting strategy and the decrypting strategy corresponding to the encrypting strategy used for communication between the first electronic signature token and the second electronic signature token, and sends at least the decrypting strategy to the first electronic signature token.

It can be seen from above that, in way 1, the second electronic signature token determines whether the electronic signature token initiating a negotiation with the second electronic signature token about the encrypting strategy and the decrypting strategy is the first electronic signature token by comparing the second pending verification code with the first matching code obtained locally, thus authenticating the identity of the first electronic signature token. Moreover, the second electronic signature token sends the decrypting algorithm to the first electronic signature token after determining the identity of the first electronic signature token, thus ensuring the safety of transmitting the private key.

Way 2: the first electronic signature token and the second electronic signature token obtain a correspondence among first matching codes, encrypting strategies, and decrypting strategies and search for the encrypting strategy and the decrypting strategy corresponding to the first matching code according to the correspondence, and if the encrypting strategy and the decrypting strategy are found, take the encrypting strategy and the decrypting strategy found as the encrypting strategy and the decrypting strategy corresponding to the encrypting strategy used for communication between the first electronic signature token and the second electronic signature token.

In way 2, the first electronic signature token and the second electronic signature token determine the encrypting strategy and the decrypting strategy used for communication therebetween by searching the correspondence obtained locally, which is simple to implement, and does not require information interaction between the first electronic signature token and the second electronic signature token, thus reducing risk of information leakage.

Specifically, each of the first electronic signature token and the second electronic signature token inputs the matching code as an input parameter into a pre-set algorithm, so as to compute a unique pair of encrypting strategy and decrypting strategy, in which the pre-set algorithm is used as the encrypting strategy and decrypting strategy for the private key.

In order to further ensure the safety of the private key, the validity of the first electronic signature token may be verified, which is described in detail as follows.

The private key backup request data packet further includes a first signature issued by a CA (Certificate Authority) server to the first electronic signature token.

Thus, before obtaining the second matching code from the matching code information in the private key backup request data packet, the second electronic signature token may perform following operations.

The second electronic signature token verifies the first signature after obtaining the private key backup request data packet, and if the first signature passes verification, the second electronic signature token obtains the second matching code from the matching code information in the private key backup request data packet.

It can be seen from above that, if the first signature of the first electronic signature token passes verification, it indicates that the first electronic signature token is legal, otherwise it indicates that the first electronic signature token is illegal. In this way, subsequent operations may be performed according to the verification results, thus ensure the safety of the process for backing up the private key.

In some embodiments, the private key used by signing the private key backup request data packet and the public key used by the second electronic signature token for verifying the private key backup request data packet processed signing are negotiated in advance, and then written into the first electronic signature token and the second electronic signature token.

In order to avoid a problem that a legal electronic signature token obtains the first signature, pretends to be the first electronic signature token and steals the private key of the second electronic signature token, leading to leaking the private key, following operations are performed.

Specifically, sending by the first electronic signature token the encrypted private key backup request data packet includes following operations.

Instead of sending the encrypted private key backup request data packet directly, the first electronic signature token firstly signs the encrypted private key backup request data packet, and then sends the signed and encrypted private key backup request data packet.

Accordingly, before decrypting the encrypted private key backup request data packet to obtain the private key backup request data packet, the second electronic signature token performs following operations.

The second electronic signature token verifies the signed and encrypted private key backup request data packet after obtaining the signed and encrypted private key backup request data packet, and if the signed and encrypted private key backup request data packet passes verification, the second electronic signature token decrypts the encrypted private key backup request data packet to obtain the private key backup request data packet.

It can be seen from above that, by signing the private key backup request data packet by the first electronic signature token, and verifying by the second electronic signature token the private key backup request data packet, the identity of the first electronic signature token requesting for backup may be authenticated. In this way, the electronic signature token having the first signature cannot steal the private key of the second electronic signature token, thus improving the security of backing up the private key.

Preferably, in order to ensure the safety of information transmission, an encrypted matching code is included in the matching code information in the private key backup request data packet.

Accordingly, obtaining by the second electronic signature token the second matching code from the matching code information in the private key backup request data packet includes: obtaining by the second electronic signature token the decrypting strategy of the matching code information in the private key backup request data packet, and decrypting the matching code information in the private key backup request data packet using the decrypting strategy to obtain the second matching code.

Specifically, the encrypting strategy and decrypting strategy may be pre-stored in the electronic signature token, or may be determined by negotiation. Certainly, the electronic signature token may encrypt and decrypt the matching code in following ways.

The first electronic signature token may encrypt the matching code as follows.

The first electronic signature token encrypts the matching code using the secret key in the first signature, so as to obtain the encrypted matching code.

The second electronic signature token may decrypt the encrypted matching code as follows.

The second electronic signature token obtains the secret key from the private key backup request data packet, and decrypts the encrypted matching code using the secret key.

It can be seen from above that, the secret key in the first signature is used for encrypting the matching code, and the secret key (a plaintext of the first signature) for decrypting the encrypted matching code may also be obtained directly from the private key backup request data packet, and thus it is easy to implement encrypting and decrypting the matching code.

Similarly, in order to ensure the safety of backing up the private key, the private key backup response data packet may includes a second signature issued by the CA server to the second electronic signature token.

Accordingly, before decrypting the encrypted private key backup response data packet using the decrypting strategy to obtain the private key backup response data packet, the first electronic signature token may further perform following operations.

The first electronic signature token verifies the second signature after obtaining the encrypted private key backup response data packet.

If the second signature passes verification, the first electronic signature token decrypts the encrypted private key backup response data packet using the decrypting strategy to obtain the private key backup response data packet.

It can be seen from above that, if the second signature of the second electronic signature token passes verification, it indicates that the second electronic signature token is legal; if the second signature does not pass verification, it indicates that the second electronic signature token is illegal. In this way, subsequent operations may be performed according to the verification results, thus ensuring the safety of backing up the private key.

Similarly, in order to avoid a problem that a legal electronic signature token obtains the second signature, pretends to be the second electronic signature token and sends the wrong private key to the first electronic signature token, leading to failure of backing up the private key, following operations may be performed.

Specifically, sending by the second electronic signature token the encrypted private key backup response data packet includes following operations.

The second electronic signature token signs the encrypted private key backup response data packet, and sends the signed and encrypted private key backup response data packet.

Accordingly, before decrypting the encrypted private key backup response data packet using the decrypting strategy to obtain the private key backup response data packet, the first electronic signature token further perform following operations.

The first electronic signature token verifies the signed and encrypted private key backup response data packet, after obtaining the signed and encrypted private key backup response data packet.

If the signed and encrypted private key backup response data packet passes verification, the first electronic signature token decrypts the encrypted private key backup response data packet using the decrypting strategy to obtain the private key backup response data packet.

It can be seen from above that, by signing the private key backup response data packet by the second electronic signature token, and verifying by the first electronic signature token the private key backup response data packet, the identity of the first electronic signature token initiating the backup response may be authenticated. In this way, the legal electronic signature token having the second signature cannot prevent the first electronic signature token from obtaining the correct private key, thus ensuring that the first electronic signature token may backup the correct private key.

In conclusion, the first electronic signature token may include the following private key information: the secret key for encrypting the matching code, the private key for signing the local information sent to the second electronic signature token, the public key for verifying the signature data received from the second electronic signature token, and the secret key for decrypting the encrypted private key of the second electronic signature token. Accordingly, except for the private key requested by the first electronic signature token for backup, the second electronic signature token further includes: the secret key for decrypting the encrypted matching code, the private key for signing the local information sent to the second electronic signature token, the public key for verifying the signature data received from the first electronic signature token, and the secret key for encrypting the private key of the second electronic signature token.

Figure 2:
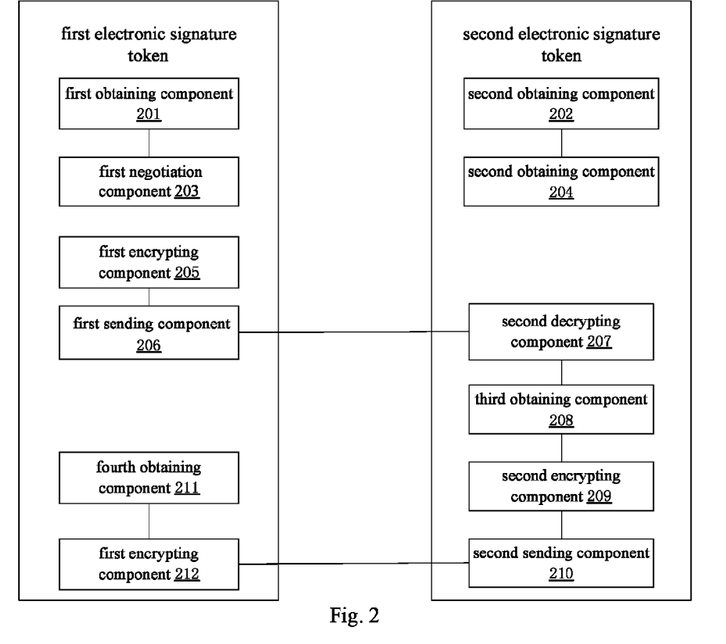
FIG. 2 is a block diagram of a system for backing up a private key of an electronic signature token according to an embodiment of the present disclosure.

FIG. 2 is a block diagram of a system for backing up a private key of an electronic signature token according to an embodiment of the present disclosure. The system embodiment shown in FIG. 2 includes a first electronic signature token and a second electronic signature token, in which the first electronic signature token includes a first obtaining component 201, a first negotiation component 203, a first encrypting component 205, a first sending component 206, a first decrypting component 212 and a fourth obtaining component 211, the second electronic signature token includes a second obtaining component 202, a second negotiation component 204, a second decrypting component 207, a third obtaining component 208, a second encrypting component 209, and a second sending component 210.

Each of the first obtaining component 201 and the second obtaining component 202 is configured to obtain a first matching code.

The first negotiation component 203 and the second negotiation component 204 are configured to negotiate using the first matching code, an encrypting strategy and a decrypting strategy corresponding to the encrypted strategy used for communication between the first electronic signature token and the second electronic signature token.

The first encrypting component 205 is configured to encrypt a private key backup request data packet using the encrypting strategy, in which the private key backup request data packet includes matching code information.

The first sending component 206 is configured to send an encrypted private key backup request data packet.

The second decrypting component 207 is configured to decrypt the encrypted private key backup request data packet to obtain the private key backup request data packet, after receiving the encrypted private key backup request data packet.

The third obtaining component 208 is configured to obtain a second matching code from the matching code information in the private key backup request data packet, in which the second matching code is used as a first pending verification code.

The second encrypting component 209 is configured to encrypt a private key backup response data packet using the encrypting strategy if the first pending verification code is identical with the first matching code obtained locally, in which the private key backup response data packet includes the private key.

The second sending component 210 is configured to send an encrypted private key backup response data packet.

The first decrypting component 212 is configured to decrypt the encrypted private key backup response data packet using the decrypting strategy to obtain the private key backup response data packet, after obtaining the encrypted private key backup response data packet.

The fourth obtaining component 211 is configured to obtain the private key from the private key backup response data packet.

In some embodiments, the first negotiation component 203 is configured to send a second pending verification code to the second electronic signature token, in which the first matching code obtained by the first electronic signature token is used as the second pending verification code; and the second negotiation component 204 is configured to obtain the second pending verification code, to determine whether the second pending verification code is identical with the first matching code obtained locally, to generate the encrypting strategy and the decrypting strategy corresponding to the encrypting strategy used for communication between the first electronic signature token and the second electronic signature token if the second pending verification code is identical with the first matching code obtained locally, and to send the decrypting strategy to the first negotiation component 203.

In some embodiments, each of the first negotiation component 203 and the second negotiation component 204 is configured to obtain a correspondence among first matching codes, encrypting strategies, and decrypting strategies, to search for the encrypting strategy and the decrypting strategy corresponding to the first matching code according to the correspondence, and to take the encrypting strategy and the decrypting strategy found as the encrypting strategy and the decrypting strategy corresponding to the encrypting strategy used for communication between the first electronic signature token and the second electronic signature token if the encrypting strategy and the decrypting strategy are found.

In some embodiments, the private key backup request data packet further includes a first signature issued by a CA server to the first electronic signature token.

Accordingly, the second electronic signature token further includes a first verification component.

The first verification component is configured to verify the first signature after obtaining the private key backup request data packet, and to trigger a process of obtaining the second matching code from the matching code information in the private key backup request data packet if the first signature passes verification.

In some embodiments, the first sending component 206 is configured to sign the encrypted private key backup request data packet, and to send the signed and encrypted private key backup request data packet.

Accordingly, the second electronic signature token further includes a second verification component.

The second verification component is configured to verify the signed and encrypted private key backup request data packet after obtaining the signed and encrypted private key backup request data packet, and to trigger a process of decrypting the encrypted private key backup request data packet to obtain the private key backup request data packet, if the signed and encrypted private key backup request data packet passes verification.

In some embodiments, the matching code information in the private key backup request data packet includes an encrypted matching code.

Accordingly, the third obtaining component 208 is configured to obtain the decrypting strategy of the matching code information in the private key backup request data packet, and to decrypt the matching code information in the private key backup request data packet using the decrypting strategy, so as to obtain the second matching code.

In some embodiments, the private key backup response data packet further includes a second signature issued by the CA server to the second electronic signature token.

Accordingly, the first electronic signature token further includes a third verification component.

The third verification component is configured to verify the second signature after obtaining the encrypted private key backup response data packet, and to trigger a process of decrypting the encrypted private key backup response data packet using the decrypting strategy to obtain the private key backup response data packet, if the second signature passes verification.

In some embodiments, the second sending component 210 is configured to sign the encrypted private key response data packet, and to send the signed and encrypted private key backup response data packet.

Accordingly, the second electronic signature token further includes a fourth verification component.

The fourth verification component is configured to verify the signed and encrypted private key backup response data packet after obtaining the signed and encrypted private key backup response data packet, and to trigger a process of decrypting the encrypted private key backup response data packet using the decrypting strategy to obtain the private key backup response data packet, if the signed and encrypted private key backup response data packet passes verification.

Compared to the related art, technical solutions in the present disclosure at least have following benefits. The first electronic signature token and the second electronic signature token determine the encrypting strategy and the decrypting strategy used for communication between the first electronic signature token and the second electronic signature token by using the first matching code, thus improving the randomness of the encrypting strategy and the decrypting strategy, enhancing the communication safety between the first electronic signature token and the second electronic signature token, and ensuring the safety of transmitting the private key in the safe communication environment between the first electronic signature token and the second electronic signature token. Moreover, the first electronic signature token sends the matching code obtained by itself to the second electronic signature token, and the second electronic signature token determines whether there is the primary-backup relationship between the second electronic signature token and the first electronic signature token according to the matching code, and transmits the private key after determining the primary-backup relationship between the second electronic signature token and the first electronic signature token, thus ensuring the safety of backing up the private key.

Any process or method described in a flow chart or described herein in other ways may be understood to include one or more components, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing component, or these cells may be separate physical existence, or two or more cells are integrated in a processing component. The integrated component may be realized in a form of hardware or in a form of software function components. When the integrated component is realized in a form of software function component and is sold or used as a standalone product, the integrated component may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for backing up a private key of an electronic signature token, comprising:
   obtaining by each of a first electronic signature token and a second electronic signature token a first matching code;
   negotiating, by the first electronic signature token and the second electronic signature token using the first matching code, an encrypting strategy and a decrypting strategy corresponding to the encrypting strategy used for communication between the first electronic signature token and the second electronic signature token;
   encrypting by the first electronic signature token a private key backup request data packet using the encrypting strategy, wherein the private key backup request data packet comprises matching code information;
   sending by the first electronic signature token an encrypted private key backup request data packet;
   decrypting by the second electronic signature token the encrypted private key backup request data packet to obtain the private key backup request data packet, after receiving the encrypted private key backup request data packet;
   obtaining by the second electronic signature token a second matching code from the matching code information in the private key backup request data packet, and taking the second matching code as a first pending verification code;
   when the first pending verification code is identical with the first matching code obtained locally, encrypting by the second electronic signature token a private key backup response data packet using the encrypting strategy, wherein the private key backup response data packet comprises the private key;
   sending by the second electronic signature token an encrypted private key backup response data packet; and
   decrypting by the first electronic signature token the encrypted private key backup response data packet using the decrypting strategy to obtain the private key backup response data packet after obtaining the encrypted private key backup response data packet, and obtaining the private key from the private key backup response data packet.

2. The method according to claim 1, wherein negotiating by the first electronic signature token and the second electronic signature token using the first matching code, an encrypting strategy and a decrypting strategy corresponding to the encrypting strategy used for communication between the first electronic signature token and the second electronic signature token, comprises:
   sending by the first electronic signature token a second pending verification code to the second electronic signature token, in which the first matching code obtained by the first electronic signature token is used as the second pending verification code;
   determining by the second electronic signature token whether the second pending verification code is identical with the first matching code obtained locally, after obtaining the second pending verification code;
   when the second pending verification code is identical with the first matching code obtained locally, generating by the second electronic signature token the encrypting strategy and the decrypting strategy corresponding to the encrypting strategy used for communication between the first electronic signature token and the second electronic signature token; and
   sending by the second electronic signature token at least the decrypting strategy to the first electronic signature token.

3. The method according to claim 1, wherein negotiating by the first electronic signature token and the second electronic signature token using the first matching code, an encrypting strategy and a decrypting strategy corresponding to the encrypting strategy used for communication between the first electronic signature token and the second electronic signature token, comprises:
   obtaining by the first electronic signature token and the second electronic signature token a correspondence among first matching codes, encrypting strategies, and decrypting strategies;
   searching for, by the first electronic signature token and the second electronic signature token, the encrypting strategy and the decrypting strategy corresponding to the first matching code according to the correspondence; and
   when the encrypting strategy and the decrypting strategy are found, taking the encrypting strategy and the decrypting strategy found as the encrypting strategy and the decrypting strategy corresponding to the encrypting strategy used for communication between the first electronic signature token and the second electronic signature token.

4. The method according to claim 3, wherein the private key backup request data packet further comprises a first signature issued by a CA server to the first electronic signature token; and before obtaining by the second electronic signature token the second matching code from the matching code information in the private key backup request data packet, the method further comprises:

verifying the first signature by the second electronic signature token after receiving the private key backup request data packet; and when the first signature passes verification, obtaining by the second electronic signature token the second matching code from the matching code information in the private key request data packet.

5. The method according to claim 4, wherein sending by the first electronic signature token the encrypted private key backup request data packet comprises:

signing by the first electronic signature token the encrypted private key backup request data packet, and sending the signed and encrypted private key backup request data packet;

before decrypting by the second electronic signature token the encrypted private key backup request data packet to obtain the private key backup request data packet, the method further comprises:

verifying by the second electronic signature token the signed and encrypted private key backup request data packet after obtaining the signed and encrypted private key backup request data packet; and when the signed and encrypted private key backup request data packet passes verification, decrypting by the second electronic signature token the encrypted private key backup request data packet to obtain the private key backup request data packet.

6. The method according to claim 5, wherein the matching code information in the private key backup request data packet comprises an encrypted matching code;

obtaining by the second electronic signature token the second matching code from the matching code information in the private key backup request data packet, comprises:

obtaining by the second electronic signature token a decrypting strategy of the matching code information in the private key backup request data packet, and decrypting the matching code information in the private key backup request data packet using the decrypting strategy to obtain the second matching code.

7. The method according to claim 6, wherein the private key backup response data packet further comprises a second signature issued by the CA server to the second electronic signature token;

before decrypting by the first electronic signature token using the decrypting strategy the encrypted private key backup response data packet to obtain the private key backup response data packet, the method further comprises:

verifying the second signature by the first electronic signature token after obtaining the encrypted private key backup response data packet;

when the second signature passes verification, decrypting by the first electronic signature token using the decrypting strategy the encrypted private key backup response data packet to obtain the private key backup response data packet.

8. The method according to claim 1, wherein the private key backup request data packet further comprises a first signature issued by a CA server to the first electronic signature token; and before obtaining by the second electronic signature token the second matching code from the matching code information in the private key backup request data packet, the method further comprises:

verifying the first signature by the second electronic signature token after receiving the private key backup request data packet; and when the first signature passes verification, obtaining by the second electronic signature token the second matching code from the matching code information in the private key request data packet.

9. The method according to claim 1, wherein sending by the first electronic signature token the encrypted private key backup request data packet comprises:

signing by the first electronic signature token the encrypted private key backup request data packet, and sending the signed and encrypted private key backup request data packet;

before decrypting by the second electronic signature token the encrypted private key backup request data packet to obtain the private key backup request data packet, the method further comprises:

verifying by the second electronic signature token the signed and encrypted private key backup request data packet after obtaining the signed and encrypted private key backup request data packet; and when the signed and encrypted private key backup request data packet passes verification, decrypting by the second electronic signature token the encrypted private key backup request data packet to obtain the private key backup request data packet.

10. The method according to claim 1, wherein the matching code information in the private key backup request data packet comprises an encrypted matching code;

obtaining by the second electronic signature token the second matching code from the matching code information in the private key backup request data packet, comprises:

obtaining by the second electronic signature token a decrypting strategy of the matching code information in the private key backup request data packet, and decrypting the matching code information in the private key backup request data packet using the decrypting strategy to obtain the second matching code.

11. The method according to claim 1, wherein the private key backup response data packet further comprises a second signature issued by a CA server to the second electronic signature token;

before decrypting by the first electronic signature token using the decrypting strategy the encrypted private key backup response data packet to obtain the private key backup response data packet, the method further comprises:

verifying the second signature by the first electronic signature token after obtaining the encrypted private key backup response data packet;

when the second signature passes verification, decrypting by the first electronic signature token using the decrypting strategy the encrypted private key backup response data packet to obtain the private key backup response data packet.

12. The method according to claim 1, wherein sending by the second electronic signature token the encrypted private key backup response data packet comprises:
  signing by the second electronic signature token the encrypted private key backup response data packet, and sending the signed and encrypted private key backup response data packet;

before decrypting by the first electronic signature token using the decrypting strategy the private key backup response data packet to obtain the private key backup response data packet, the method further comprises:
  verifying by the first electronic signature token the signed and encrypted private key backup response data packet after obtaining the signed and encrypted private key backup response data packet;
  when the signed and encrypted private key backup response data packet passes verification, decrypting by the first electronic signature token using the decrypting strategy the encrypted private key backup response data packet to obtain the private key backup response data packet.

* * * * *